United States Patent [19]

Toyoda et al.

[11] Patent Number: 5,282,307
[45] Date of Patent: Feb. 1, 1994

[54] METALLIC ORNAMENTAL PLATE MANUFACTURING METHOD

[75] Inventors: Osamu Toyoda, Nagoya; Katsumi Makino, Inazawa, both of Japan

[73] Assignee: Mitsubishi Denki Kabushiki Kaisha, Tokyo, Japan

[21] Appl. No.: 2,046

[22] Filed: Jan. 8, 1993

Related U.S. Application Data

[62] Division of Ser. No. 798,651, Nov. 26, 1991, abandoned.

[51] Int. Cl.[5] .............................................. B21B 1/46
[52] U.S. Cl. ..................................... 29/527.4; 205/121; 205/122; 205/324
[58] Field of Search ..................... 205/324, 121, 122; 29/527.4

[56]   References Cited
U.S. PATENT DOCUMENTS

| | | | |
|---|---|---|---|
| 2,324,106 | 7/1919 | Pettit | 205/324 X |
| 2,691,627 | 10/1954 | Johnson | 205/121 |
| 2,941,930 | 6/1960 | Mostovych et al. | 205/324 X |
| 4,926,843 | 5/1990 | Vocke et al. | 29/527.4 X |

FOREIGN PATENT DOCUMENTS

| | | |
|---|---|---|
| 51-8419 | 3/1976 | Japan ............. 29/527.4 |
| 63-143289 | 6/1988 | Japan . |

*Primary Examiner*—Carl J. Arbes
*Attorney, Agent, or Firm*—Leydig, Voit & Mayer

[57]   ABSTRACT

A method for manufacturing a metallic ornamental plate is provided comprising the steps of press-forming a light metal plate to provide a first planar region having a first surface, and a second planar region having a second surface elevated from the first surface; and machine-finishing the elevated second surface of the second planar region to define a distinct ornamental pattern against the first surface wherein the machine-finishing step removes material from the elevated second surface.

7 Claims, 4 Drawing Sheets

F I G. 1
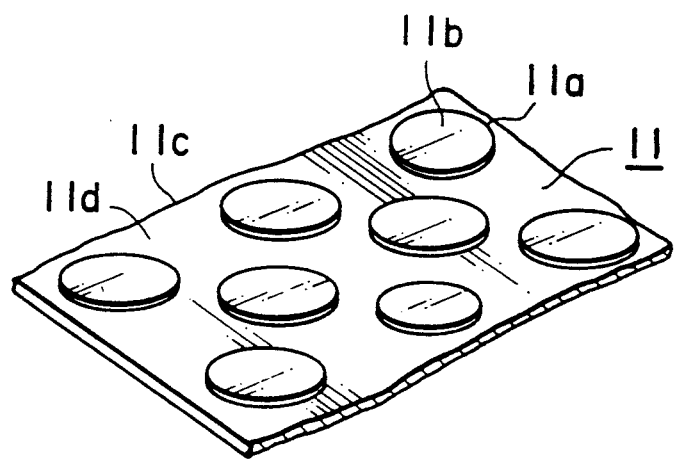
F I G. 2
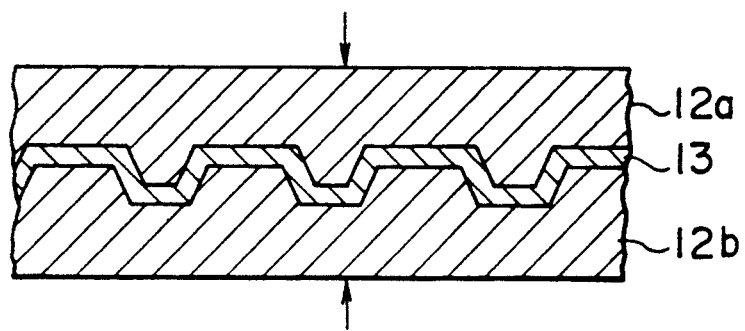

METALLIC ORNAMENTAL PLATE MANUFACTURING METHOD

This application is a divisional of application Ser. No. 07/798,651, filed Nov. 26, 1991 now abandoned.

BACKGROUND OF THE INVENTION

This invention relates to a flame-resistant metallic plate which is particularly suitable for use in a wall and a door of a building and an elevator system.

FIG. 9 is a fragmental front view of one example of a conventional metallic ornamental plate and FIG. 10 is a sectional view taken along line X—X of FIG. 9.

In the figures, reference numeral 1 is an ornamental plate main body in the shape of a mesh having woven bars 1a and 1b made of brass and stainless steel, respectively. The ornamental plate main body 1 has formed thereon planar ornamental surfaces 1c by planar pressing. The planar ornamental surfaces 1c are hair-line finished such as by emery papers.

Also, FIG. 11 is a sectional view illustrating a conventional ornamental plate disclosed in Japanese Patent Laid-Open No. 60-30340.

In FIG. 11, 2 is a base plate made of an inorganic board such as plaster board, fiber cement board, GRC or concrete board. The base plate 2 has an embossed surface. Element 3 are first colored portions disposed on the embossed portions of the base plate 2 and elements 4 are second colored portions disposed on the portions other than the embossed portions of the base plate 2.

When the conventional ornamental plate of such structure is to be manufactured, the first colored portions 3 are first formed by, for example, contacting and rolling a roller with ink on it only on the embossed portions. Then, the second colored portions 4 are provided by a suitable method on the entire surface of the base plate 2. Thereafter, the second color portions 4 on the embossed portions are removed by such as the buff-polishing and the use of a solvent, whereby the first colored portions 3 are exposed on the embossed portions and the above-described ornamental plate is obtained.

FIG. 12 is a sectional view of a conventional ornamental plate disclosed in Japanese Patent Laid-Open No. 58-275.

In FIG. 12, element 5 is a formed plate in which a core paper 5a and a surface prepared paper 5b are laminated. The formed plate 5 has an embossed surface. Element 6 is a coloring agent applied on the recessed portions of the formed plate 5.

In order to manufacture the conventional ornamental plate of the above structure, the coloring agent 6 is first applied to the entire surface of the formed plate 5. Then, a roller (not shown) on which a solvent is held is brought into contact with the surface of the formed plate 5, thereby removing the coloring agent 6 from the embossed portions on the surface of the formed plate 5. Thus, the coloring agent 6 remains only in the recessed portions of the formed plate 5.

In the conventional metallic ornamental plate, the ornamental plate main body 1 is made of brass or stainless steel, so that the overall weight is large and the manufacturing cost is high. Also, since the brass or stainless steel is hard, a high-pressure large press is necessary for pressing substantially planar products, and the uniform finishing over the entire surface is difficult to obtain, and the flat surfaces of the press dies are easily damaged. On the other hand, in the conventional ornamental panel illustrated in FIG. 11 or 12, while the different colors can be applied in the embossed base plate 2 or the convex and concave portions of the formed plate 5, these colored panels are not made of a metallic material, so that they are applicable only to a limited use because of poor fire-resistance and mechanical strength, which makes it difficult to be used in an elevator car. Even if such 9 coloring method is applied to a metal plate, sufficient difference in qualitative appearance between the elevated and non-elevated portions cannot be obtained.

SUMMARY OF THE INVENTION

Accordingly, one object of the present invention is to provide a metallic ornamental plate free from the above discussed problems of the conventional ornamental plate.

Another object of the present invention is to provide a metallic ornamental plate which can be provided with a distinct pattern of different qualitative appearance.

Another object of the present invention is to provide a metallic ornamental plate which is light-weight.

Another object of the present invention is to provide a metallic ornamental plate which is inexpensive.

Another object of the present invention is to provide a metallic ornamental plate which can be manufactured with a small press.

Another object of the present invention is to provide a metallic ornamental plate which can be uniformly formed by a press without damaging the press dies.

With the above objects in view, the metallic ornamental plate of the present invention made of a light weight metal material, comprises a first planar region having a first surface and a second planar region having a second surface elevated from the first surface and machine-finished to define a distinct ornamental pattern against the first surface. The second planar region may be a press-formed embossed portion, and the second surface may be finished by at least one of polishing, anodic treatment and machining to form a sharp edge. When the light weight metal material is an aluminum alloy, the first surface may be finished with black alumite, and the second surface may be finished with golden alumite.

The metallic ornamental plate is manufactured by press-forming a light metal plate to provide a first planar region having a first surface and a second planar region having a second surface elevated from the first surface. Then, the elevated second surface of the second planar region is machine-finished such as filing to define a distinct ornamental pattern against the first surface.

The method for manufacturing a metallic ornamental plate may comprise the steps of press-forming an aluminum alloy plate to provide in the aluminum alloy plate a first planar region having a first surface, and a second embossed planar region having a second surface elevated from the first surface. A first alumite finish is applied to the entire surface of the aluminum alloy plate, and the first alumite finish on the elevated second surface is removed from the embossed planar region so that the base aluminum alloy is exposed. Then, a second alumite finish is applied to the elevated second surface from which said first alumite finish is removed.

BRIEF DESCRIPTION OF THE DRAWINGS

The present invention will become more readily apparent from the following detailed description of the preferred embodiments of the present invention taken in conjunction with the accompanying drawings, in which:

FIG. 1 is a perspective view illustrating one embodiment of the metallic ornamental plate of the present invention;

FIG. 2 is a sectional view illustrating the manner is which the metallic plate is pressed between press dies;

DESCRIPTION OF THE PREFERRED EMBODIMENTS

Figure 3:
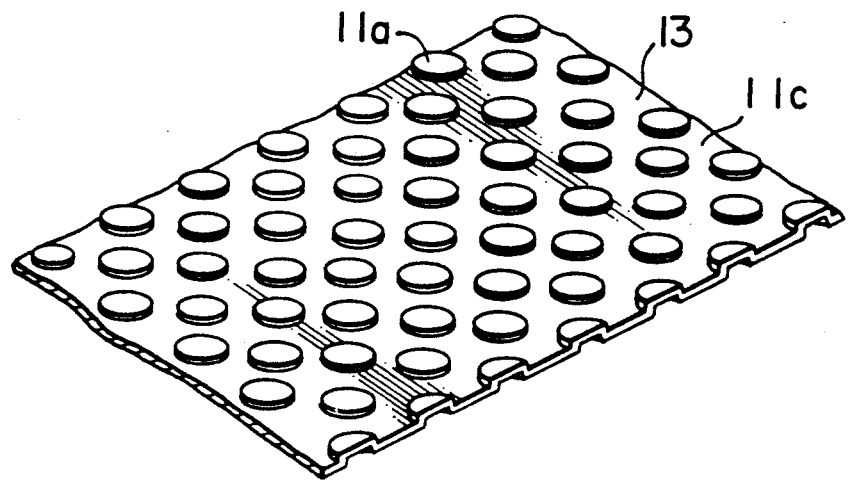
FIG. 3 is a perspective view illustrating the press-formed metallic plate.

FIG. 1 illustrates, in perspective view, a metallic ornamental plate 11 made of a light metal material of the present invention. The metallic ornamental plate 11 comprises a first planar region 11c having a first flat surface 11d and a plurality of second planar regions 11a each having a second flat surface 11b. The second planar regions 11a are press-formed embossed portions and their second surfaces 11b are substantially parallel to and elevated from the first surface 11d. The second elevated surfaces 11b are machine-finished to define distinct ornamental patterns against the first surface 11d of the first planar region 11c.

The light metal material may be aluminum or an aluminum alloy, and the second surface 11b may be finished with any suitable treatment such as polishing, anodic treatment and machining. The first surfaces 11d may be finished with black alumite, and the second surface 11b may be finished with golden alumite. The elevated second surfaces 11b are machined or filed to remove their surface layers so that each of the second planar regions 11a is provided with a sharp edge (see FIG. 6). In the illustrated embodiment, the press-formed second planar regions 11a have height of about 2 mm to 3 mm and the diameter of about 5 mm to 10 mm.

The method of manufacturing the metallic ornamental plate 11 of the present invention will now be described. As illustrated in FIG. 2, a flat blank plate made of an aluminum alloy is placed between an upper die 12a and a lower die 12b of a press machine (not shown) and press-formed into the press-formed embossed plate 13 having a plurality of embossed second planar regions 11a as illustrated in FIG. 3.

Figure 4:
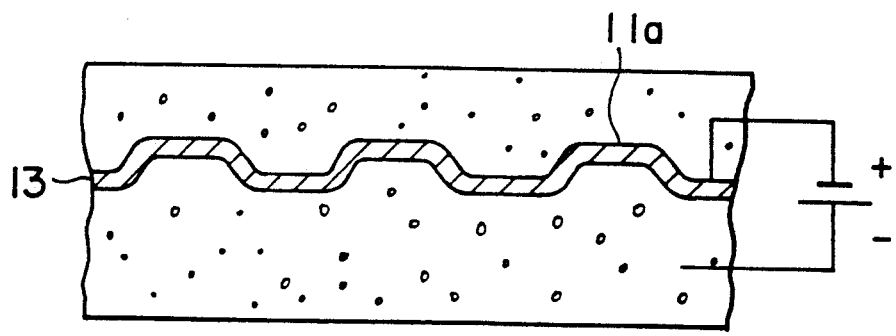
FIG. 4 is a sectional view illustrating the press-formed metallic plate being finished with black alumite.

This press-formed plate 13 is then subjected to the black alumite finishing so that the entire surface of the press-formed plate 13 is coated with a black aluminum oxide layer (not shown). This step is illustrated in FIG. 4.

Figure 5:
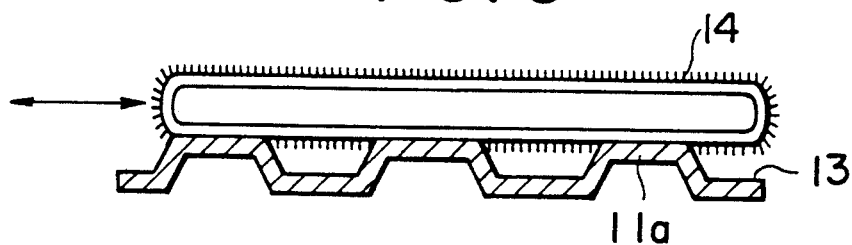
FIG. 5 is a sectional view illustrating the press-formed metallic plate being hair-line finished by emery paper.
Figure 6:
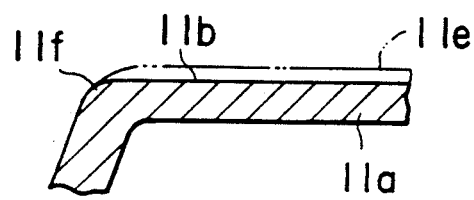
FIG. 6 is an enlarged sectional view of the embossed portion after hair-line finished.

As shown in FIG. 5, the black alumite finished press-formed plate 13 is then subjected to a filing machine 14 to apply filing or the hair-line finishing on the elevated second surfaces 11b of the embossed portions 11a until the black alumite finish is removed and the base metal of the aluminum alloy is exposed. This decreases the thickness of the embossed portions 11a as illustrated in FIG. 6, from which it is seen that the original surface shown by a phantom line 11e is reduced to that shown by a solid line. Therefore, the edge 11f of the filing-finished elevated second surface 11b is much sharper than that of the elevated surface before filing.

Figure 7:
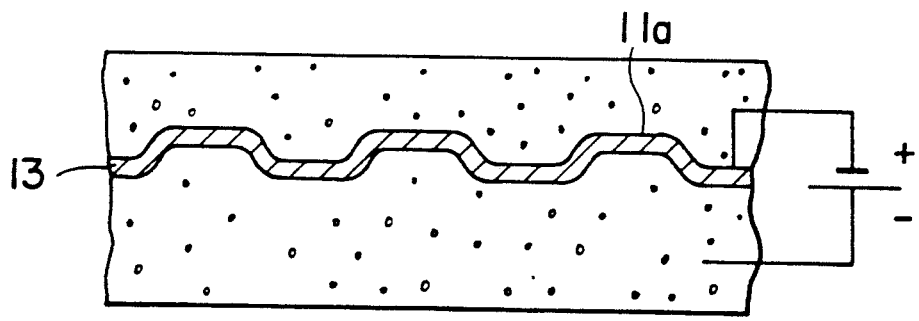
FIG. 7 is a sectional view illustrating the metallic plate being finished with golden alumite.

Then, the press-formed plate 13 is subjected to golden alumite finishing as illustrated in FIG. 7. At this time, the aluminum alloy base metal is exposed only on the elevated second surfaces 11b of the embossed portions 11a, and the surface of the remaining portion is coated with the black aluminum oxide layer, so that the golden alumite finishing can be applied only on the elevated second surfaces 11b.

Figure 8:
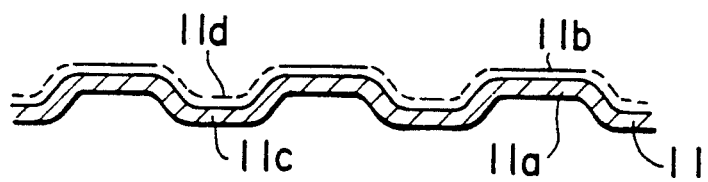
FIG. 8 is a sectional view of the metallic ornamental plate illustrated in FIG. 1.
Figure 9:
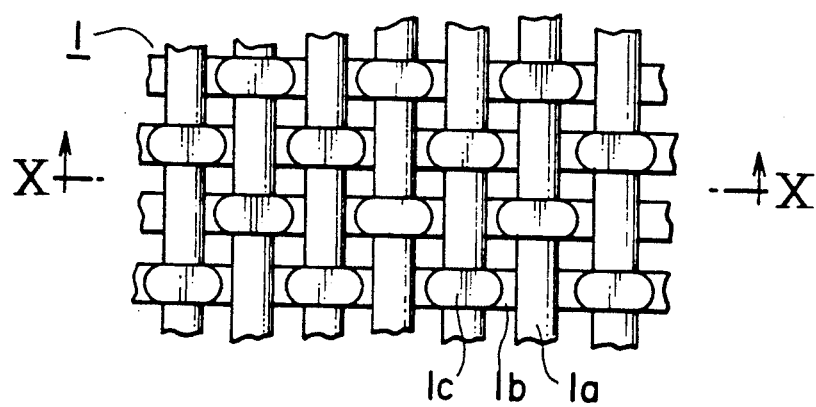
FIG. 9 is a plan view illustrating one example of a conventional ornamental plate.
Figure 10:
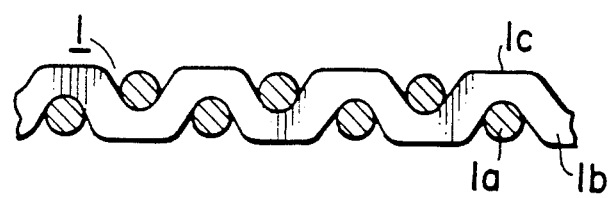
FIG. 10 is a sectional view taken along line X—X of FIG. 9.
Figure 11:
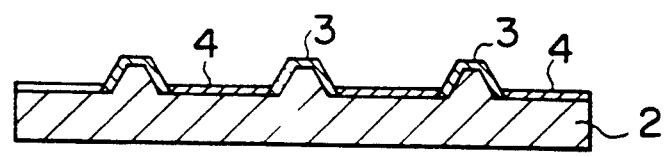
FIG. 11 is a sectional view of another example of a conventional ornamental plate.
Figure 12:
FIG. 12 is a sectional view of a still another example of a conventional ornamental plate.

FIG. 8 illustrates in section the thus-fabricated aluminum ornamental metallic plate 11 which comprises a first planar region 11c having a first surface 11d, and a second planar region 11a having a second surface 11b elevated from the first surface 11d and machine-finished to define a distinct ornamental pattern against the first surface 11d. The second planar region 11a is a press-formed embossed portion, and the first surface 11c is coated with the black aluminum oxide layer while the second surface 11b is filing-finished to define a relatively sharp edge 11f (see FIG. 6) and coated with golden aluminum oxide layer.

Since the ornamental metallic plate 11 of the present invention is made of an aluminum alloy, the weight of the plate 11 is very small and only about one third of the conventional ornamental plate and the manufacturing cost can also be small. Therefore, the ornamental metallic plate 11 of the present invention is particularly suitable as a light-weight, noncombustible resistant metallic ornamental plate for use in elevators, vehicles, aircraft, etc. Also, since the aluminum alloy plate can be press-formed with a smaller pressure as compared with the conventional ornamental plate, a smaller pressing machine can be used, the press-forming can be applied uniformly onto the entire plate, and the press dies 12a and 12b are free from being scratched by the plate.

Also, since the second surfaces 11b of the embossed portions 11a are hair-line finished, a sufficient difference in qualitative appearance is generated between the first surface 11d of the first planar region 11c and the elevated second surfaces 11b of the embossed portions 11a, and also the embossed portions 11a are provided with sharp edges 11f. Therefore, the ornamental plate 11 of the present invention has a qualitative appearance and massiveness of a high-class, quality ornamental plate which is quite different from a press-formed light alloy ornamental plate.

Also, since the first surface 11d of the first planar region 11c is alumite-finished, the plate surface is mechanically and chemically protected and the durability is increased.

Further, in the above-described embodiment, the black alumite finishing is applied before the filing and the golden alumite finishing is applied after the filing, so that the embossed portions 11a and the remaining portion 11c of the plate 11 are distinctly colored, thereby providing a superior aethetic appearance. Also, since the coloring is achieved by alumite finishing, overlapping of the colors or the leaving out of the uncolored surface is extremely difficult to be generated.

The ornamental metallic plate 11 may equally be made of any suitable light (weight live, low density) metal such as aluminum other than the aluminum alloy used in the above embodiment.

Also, while the alumite finishing is applied to the ornamental metallic plate 11 of the above embodiment, the alumite finishing may be omitted and the base metal may be left exposed or coated with a suitable paint or film layer. However, the alumite finishing is preferable because the protection and coloring can be easily and reliably achieved, and the anodic treatment is preferable even when the base metal of the metal plate is not aluminum.

The colors of the anodic treatment may be changed from black and gold of the above embodiment to other suitable colors and the number of the colors used may be increased to more than two by repeated filing or hair-line finishing. Also, the elevated first surfaces 11b of the embossed portions 11a may be left exposed after filing without applying the alumite finish.

Further, the dimensions and the configurations of the elevated first surfaces 11b are not limited to those illustrated in the figures but may be suitably modified. Also, instead of filing, the elevated second surfaces 11b may be machine finished with lapping or the like.

The ornamental metallic plate of the present invention may be used not only in elevators and buildings but also in various applications due to its noncombustibility and light weight.

As has been described, the metallic ornamental plate of the present invention is made of a light weight metal material and comprises a first planar region having a first surface and a second planar region having a second surface elevated from the first surface and machine-finished to define a distinct ornamental pattern against the first surface. The second planar region may be a press-formed embossed portion, and the second surface may be finished by at least one of polishing, anodic treatment and machining to form a sharp edge. When the light metal material is an aluminum alloy, the first surface may be finished with black alumite, and the second surface may be finished with golden alumite.

Accordingly, the metallic ornamental plate can be provided with a distinct pattern of different qualitative appearance. Also, the metallic ornamental plate can be made light-weight, so that the metallic ornamental plate can be manufactured with a small press and still allows uniform pressing without damaging the press dies which makes the metallic ornamental plate inexpensive.

What is claimed is:

1. A method for manufacturing a metallic ornamental plate comprising the steps of:

press-forming a light metal plate to provide a first planar region having a first surface, and a second planar region having a second surface elevated from said first surface; and machine-finishing said elevated second surface of said second planar region to define a distinct ornamental pattern against said first surface wherein said machine finishing step removes material form said elevated second surface.

2. A method for manufacturing a metallic ornamental plate as claimed in claim 1, wherein said machine-finishing step comprises filing of said elevated second surface.

3. A method for manufacturing a metallic ornamental plate according to claim 1 wherein said machine-finishing step comprises a step of filing to make sharper the edge of said second surface.

4. A method for manufacturing a metallic ornamental plate according to claim 1 wherein said machine finishing step comprises polishing.

5. A method for manufacturing a metallic ornamental plate according to claim 1, further including at least one step to provide dissimilar colors to said first and second surfaces.

6. A method for manufacturing a metallic ornamental plate comprising the steps of:

press-forming an aluminum alloy plate to provide in said plate a first planar region having a first surface, and a second embossed planar region having a second surface elevated from said first surface;

applying a first alumite finish to said aluminum alloy plate;

filing said elevated second surface on said embossed planar region to remove said first alumite finish thereon and to expose base aluminum alloy; and applying a second alumite finish to said elevated second surface from which said first alumite finish is removed.

7. A method for manufacturing a metallic ornamental plate according to claim 6 wherein said first and second alumite finishes are of different color.

* * * * *